March 25, 1958 D. L. LOMBARD 2,828,398
ELECTRIC INDUCTION BILLET HEATER
Filed Dec. 10, 1956 3 Sheets-Sheet 2

March 25, 1958  D. L. LOMBARD  2,828,398
ELECTRIC INDUCTION BILLET HEATER
Filed Dec. 10, 1956  3 Sheets—Sheet 3

United States Patent Office 2,828,398
Patented Mar. 25, 1958

2,828,398

ELECTRIC INDUCTION BILLET HEATER

Daniel Leo Lombard, Youngstown, Ohio, assignor to Lombard Corporation, Youngstown, Ohio, a corporation of Ohio Application December 10, 1956, Serial No. 627,402

8 Claims. (Cl. 219—10.67)

This invention relates to electric induction heaters and more particularly to means in an induction heater for restraining a billet against the thrust of a magnetic field and for bringing a temperature measuring device into contact with the billet.

In heating aluminum or other non-ferrous billets preparatory to an extrusion process, it is generally considered most efficient and practical to perform the heating operation in an electric induction furnace. In such a furnace, a billet is placed within an electrically energized coil whereby eddy currents are induced in the billet to dissipate energy sufficient to heat up the billet to the desired temperature in a very short time.

In order to most effectively perform an induction heating operation, the billet is placed within a coil structure formed from a series of axially spaced coils, each of which is connected to one phase of a polyphase alternating current source to produce a "traveling" magnetic field. In this manner the effective field produced by the coils moves progressively from one end of the coil structure to the other. This produces a "motor action" on the billet, similar to the movement of a solenoid armature, which tends to eject the billet from one end of the coil structure. Accordingly, it becomes necessary to provide some sort of stop member at one end of the coil assembly to prevent the billet from being ejected from the same.

In order to determine the temperature of the billet during a heating operation, there is usually provided a thermocouple device having a pair of spaced prong-like members of dissimilar metal which are forced into the end of the billet. As the thermocouple is heated, it generates an electrical potential which is utilized to actuate a suitable indicator device and/or automatic control means to deenergize the induction coils at the proper time.

It has been found most efficient and practical in the construction of this type of heater to mount the thermocouple on the aforementioned stop member which must itself engage the end of the billet during a heating operation. In most prior art devices the prong-like members of the thermocouple projected beyond the billet-abutting surface of the stop member so that the prongs would necessarily come into contact with the end of the billet when it engaged the stop member. The difficulty with this method, however, is that the stop member may be brought into contact with the end of a billet with great force, or the billet may slam against the stop member due to the aforesaid "motor action" with the result that the prongs of the thermocouple which project from the billet-abutting surface may be damaged.

In an effort to prevent damage to the thermocouple prongs, prior art devices usually provided springs to force the prongs to project beyond the billet-abutting surface of the stop member, the arrangement being such that the prongs could travel backward against the force of the springs during a forceful engagement of the billet and stop member. Although this arrangement may prevent damage to the prongs, it has been found, generally, that the springs will not force the prongs into good thermal contact with the end of a billet. This is especially true in cases where the thermocouple unit is an integral part of the stop member so that heat flows by conduction into the stop member and thermocouple during a heating operation. The repeated heating and cooling of the springs in such an arrangement causes them to break or lose their resilience.

It is an object of this invention to provide a combination stop member-thermocouple device for an induction billet heater in which the prongs of the thermocouple are carried behind the billet-abutting surface of the stop member until after the heating operation is started, the arrangement being such as to prevent damage to the prongs caused by a forceful engagement of a billet with said abutting surface.

More specifically, an object of the invention is to provide a thermocouple carried on a stop member for an induction billet heater, together with a time delay device for bringing the thermocouple into contact with the end of a billet after the heating operation has begun.

Another object of the invention is to provide a stop member-thermocouple assembly for a billet heater in which heat may not readily flow from the stop member to the thermocouple by conduction, thereby minimizing the effect of repeated heating and cooling of the thermocouple mechanism.

The above and other objects and features of the invention will become apparent from the following detailed description taken in connection with the accompanying drawings which form a part of this specification and in which.

Figure 1:
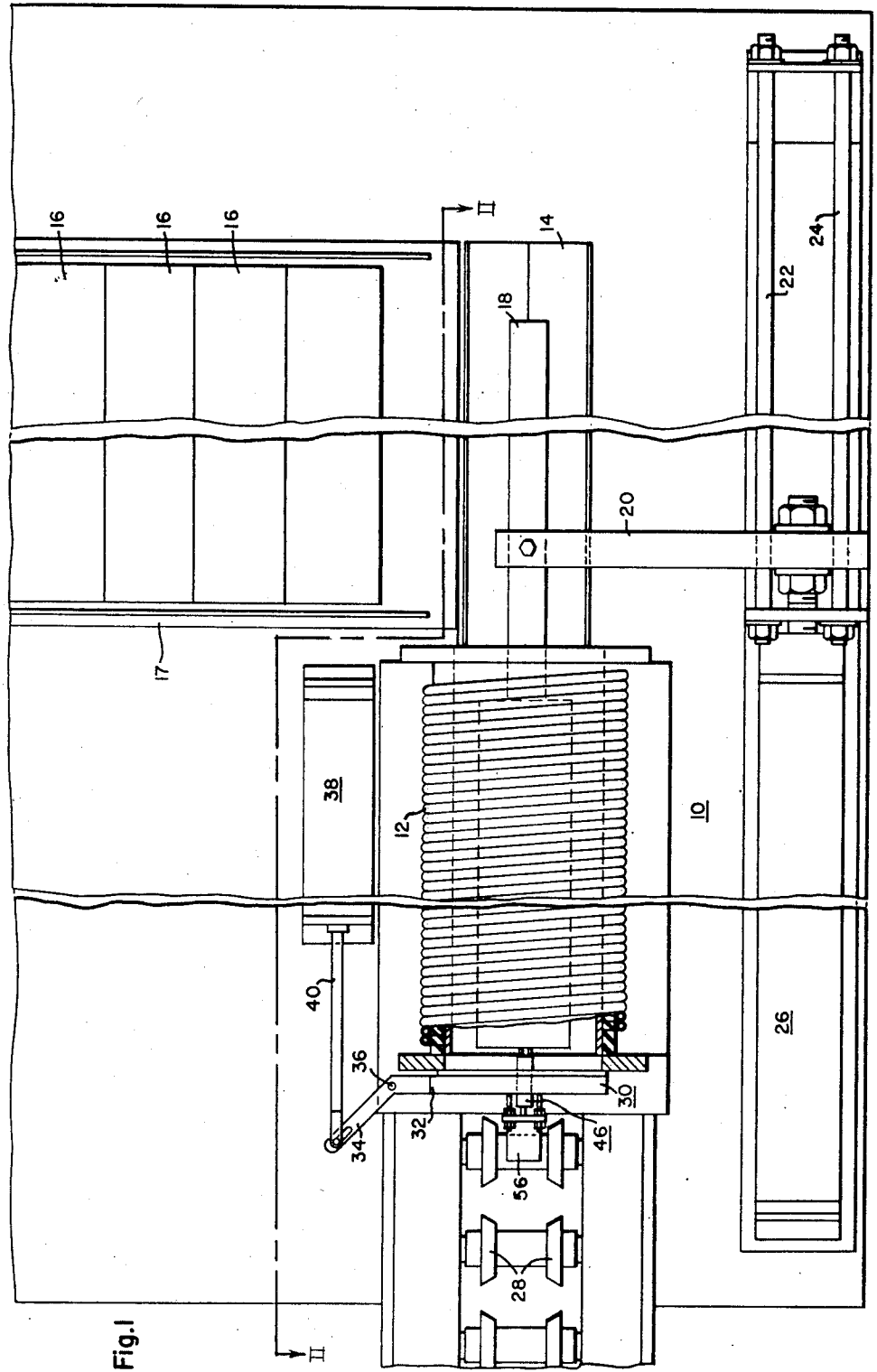
Figure 1 is a top view of a billet heater employing the present invention.
Figure 2:
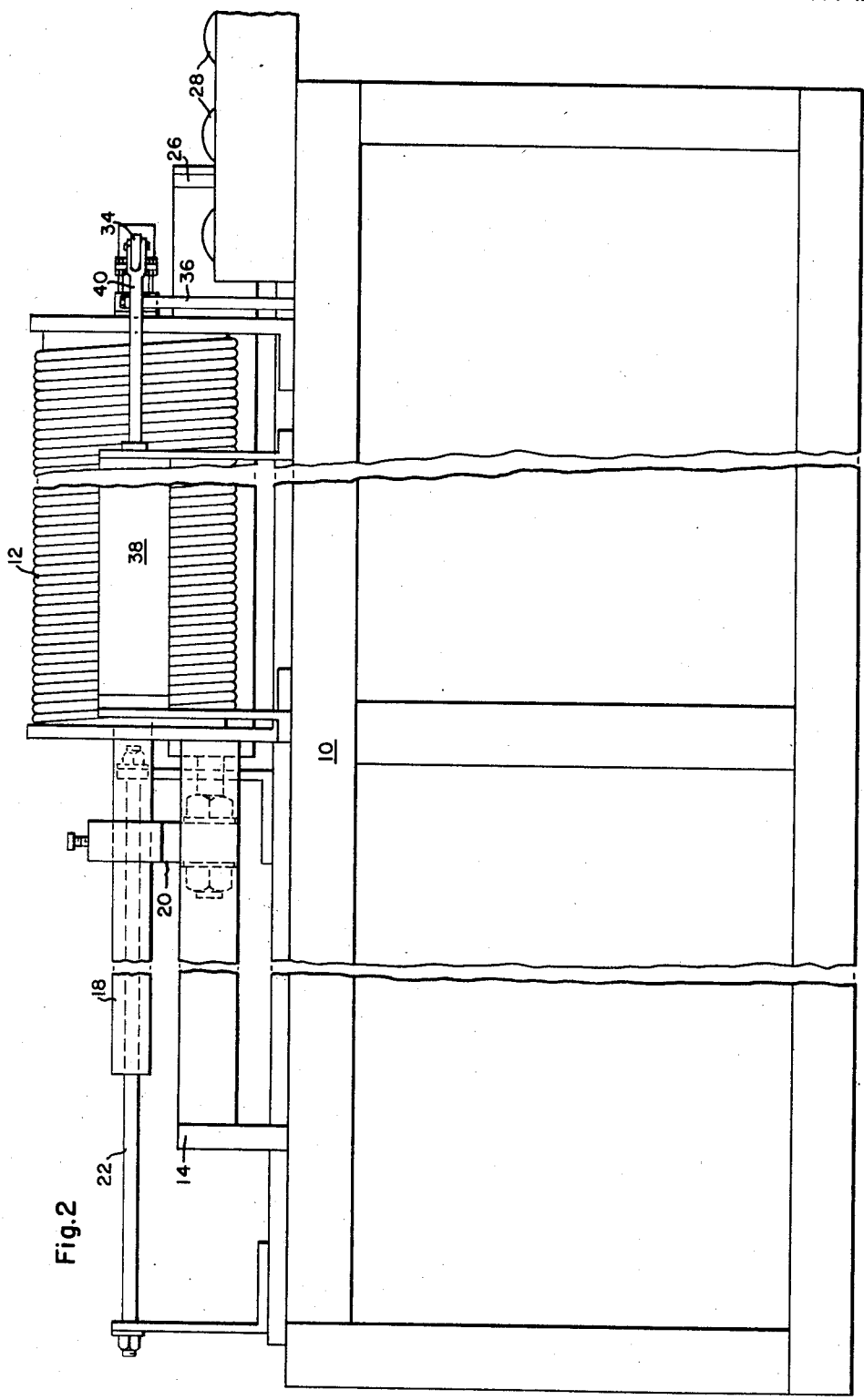
Figure 2 is a side view of the heater taken along line II—II of Figure 1.

Referring to Figures 1 and 2, the numeral 10 designates generally the frame structure of an induction heating furnace. Supported on the frame 10 is an induction coil assembly 12 which may be of generally conventional design, and which is preferably of a type adapted for use with a polyphase power system to produce a traveling magnetic field. At the entrance end of the coil assembly 12 is a V-tray 14 which is arranged to hold a billet 16 in axial alignment with the coil prior to its being pushed into the interior of the coil assembly. As will be understood, conveyor means 17 are provided to place a succession of billets 16 on the V-tray 14 one by one preparatory to their being loaded into the coil assembly 12.

To feed billets into the interior of coil assembly 12, there is provided a pusher rod 18 carried on an arm 20 which rides on two spaced bars 22 and 24. Reciprocatory motion is imparted to the arm 20 and pusher rod 18 by means of a fluid motor, generally indicated at 26, which is carried on the frame 10. At the exit end of the coil assembly 12 there are provided a series of conveyor rolls 28 which may be continuously or selectively rotated to carry a heated billet to a discharge station, not shown.

The coil assembly 12 may be of the type shown in U. S. Patent No. 2,676,234, issued April 20, 1954 to R. V. Lackner et al. This type of coil assembly will produce a traveling magnetic field which produces a motor or solenoid action tending to eject the billet from the exit end of the coil. In order to retain the billet within the coil assembly during a heating operation, there is provided a stop member assembly, generally indicated by the reference numeral 30.

Figure 3:
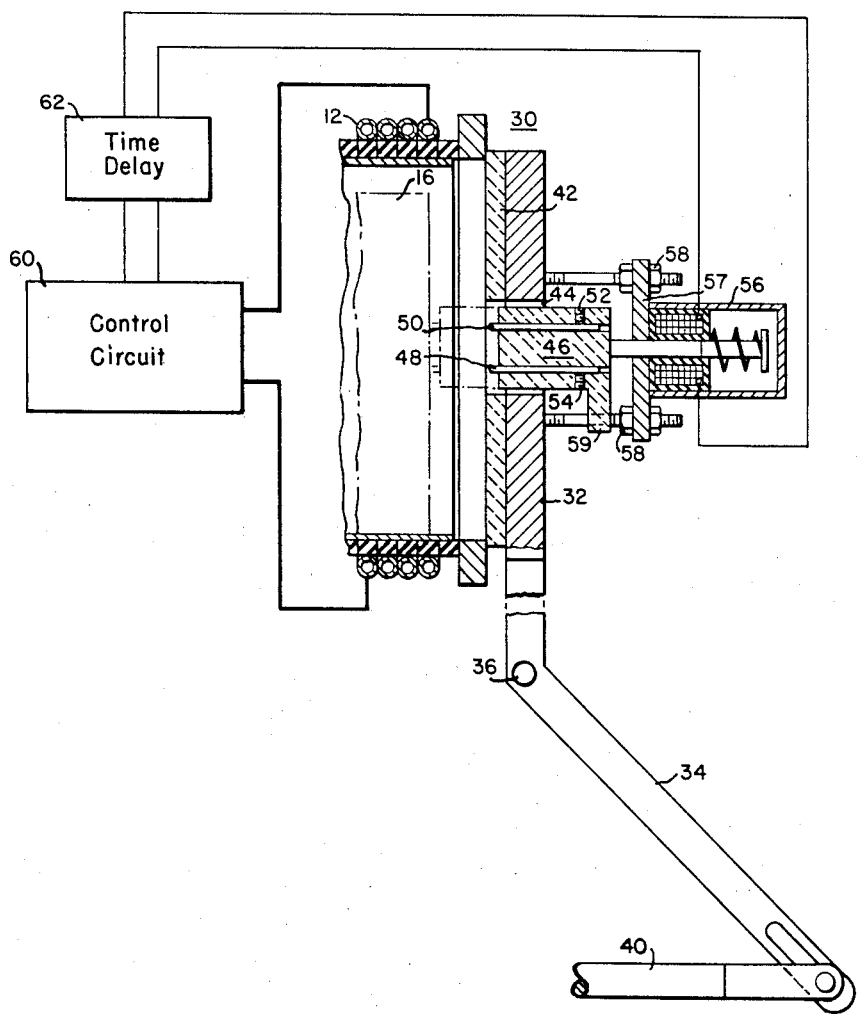
Figure 3 is a cross-sectional view of the stop member assembly of the present invention together with a block diagram of the control circuitry for the heating coil and thermocouple for the heater.

As shown in Figures 1, 2 and 3, the stop member assembly comprises a metal arm 32 carried on a lever 34 which is supported for pivotal movement on an upright shaft or axle 36. The shaft 36 is, in turn, carried by frame structure 10 on the side of coil assembly 12 opposite fluid motor 26. To rotate the arm 32 there is provided a double acting fluid motor 38 having a piston rod 40 pivotally connected to the outer extremity of lever 34, the arrangement being such that either of the opposite chambers of the fluid motor may be pressurized to rotate arm 32 in a clockwise or counter-clockwise direction, as the case may be.

The surface of arm 32 which faces the exit end of coil assembly 12 is covered with a relatively rigid insulating material 42 such as Transite (trademark). Extending through the central portion of arm 32 and insulating material 42 is an opening 44 which serves as a housing for a thermocouple 46.

The thermocouple 46 comprises a block of Micarta (trademark) or other insulating material provided with two parallel bores which carry a pair of prongs 48 and 50 of dissimilar metal. Set screws 52 and 54 are provided to secure the prongs within their bores. Electrical conductors, not shown, may be fastened to set screws 52 and 54 or may make electrical contact with the prongs in any way which is found to be best for a particular application. As will be understood, the conductors leading from the prongs may be connected to an electrical heat indicating device and/or automatic control circuitry for deenergizing the coil 12 when the temperature of a billet reaches a predetermined level.

In the embodiment shown in Figure 3, the thermocouple 46 is carried on the armature of a solenoid 56 which is mounted on a backing plate 57. The plate, in turn, is carried by a plurality of spacing bolts 58 which are threaded into the rearward face of arm 32. One of the bolts passes through an aperture in a dog 59 which extends outwardly from the Micarta block to prevent the thermocouple from twisting. The solenoid 56 is controlled by an electrical signal from the control circuitry 60 for coil 12, the signal being applied to solenoid 56 through a time delay device 62. When the coil 12 is initially energized by control circuitry 60 to start a heating operation, the solenoid 56 will not be immediately energized by virtue of time delay device 62, thus insuring that the billet 16 will be in contact with arm 32 before the prongs of the thermocouple are forced into the end of the billet. Timing means, not shown, may be provided to deenergize coil 12 in the event that thermocouple 46 fails to contact the billet, thus insuring against an overheating and possible melting of the billet within the coil.

It will be obvious that the solenoid 56 could be readily replaced by an air or hydraulic cylinder supplied with fluid pressure through a valve controlled through time delay means, such as device 62.

In operation, assuming that a heating operation has just been completed and that the thermocouple 46 has been retracted from the end of the billet, fluid motor 38 will be pressurized to rotate arm 32 in a clockwise direction to a position where it is to the side of conveyor rolls 28. The heated billet is then pushed out of the coil by the next successive billet to be heated. It has been found in actual practice that the trailing end of a heated billet must be pushed beyond the exit end of the coil and onto the conveyor rolls 28 before the traction between the billet and rolls is sufficient for the rolls themselves to move the billet. This means, of course, that the forward end of the next successive billet to be heated will project from the exit end of the coil. To force the billet back into the coil fluid motor 38 is pressurized to rotate arm 32 in a counterclockwise direction. The arm 32 thus engages the billet and forces it backward until the arm abuts the exit end of the coil assembly 12.

When the arm 32 is thus brought into contact with the end of the coil assembly, the end of the billet may abut insulating material 42, or it may have slid beyond the exit end of the coil due to its inertia. If the end of the billet does slide beyond the exit end, it will be forced against the arm 32 when the coil is energized by virtue of the forward magnetic thrust on the billet.

After a predetermined amount of time following energization of coil 12, solenoid 56 will be energized through time delay device 62 to advance the thermocouple 46 whereby the ends of prongs 48 and 50 project into the end of a billet. Following the heating operation, the thermocouple is retracted and the cycle is repeated.

It can be seen that the arrangement has numerous advantages. Since the thermocouple prongs do not project beyond the billet abutting surface of the stop member 32 until after a heating operation has begun, they cannot be damaged by the end of the billet which may slam against the stop member during a loading operation or upon initial energization of the coil when the magnetic thrust may advance the billet against the stop member with great force. The adverse effect of repeated heating and cooling of the thermocouple assembly is also minimized since heat cannot readily flow by conduction from the stop member to the thermocouple. A still further advantage lies in the simplicity of the thermocouple itself which need not be equipped with springs or other similar devices to hold the prongs against the end of a billet.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In an induction furnace of the type having an open ended induction coil within which a billet is heated, a member movable from a position remote from the open end of said induction coil to a position directly in front of said open end, said member having a surface adjacent said open end to abut a billet during a heating operation and retain the same against the thrust of a magnetic field, a thermocouple assembly carried by said member such that the entire thermocouple assembly is normally positioned behind said surface, said thermocouple assembly having at least one prong for abutting the end of a billet during a heating operation, and means for forcing said prong beyond said surface and into engagement with said billet after the billet initially comes into contact with said surface.

2. In an induction furnace of the type having an open ended induction coil within which a billet is heated, a member located at the open end of said coil for retaining a billet within the coil during a heating operation, means for moving said member from a point remote from said open end to a point directly in front of said open end, a surface on said member arranged to abut the end of a billet during a heating operation, a temperature measuring device carried by said member with the entirety of said measuring device being normally located behind said surface, and means for advancing said device from behind said surface and into contact with the end of a billet after the billet has initially come into contact with said surface.

3. In an induction furnace of the type having an open ended induction coil within which a billet is heated, a member positioned at said open end for retaining a billet within said coil during a heating operation, a surface on said member arranged to abut a billet during a heating operation, a temperature measuring device carried by said billet-retaining member with the entirety of said measuring device being normally located behind the billet-abutting surface, and means for selectively advancing the temperature measuring device from behind said surface and into contact with the end of a billet during a heating operation.

4. In an electric induction furnace of the type having an open ended induction coil within which a billet is heated, a member arranged to retain a billet within the coil during a heating operation, means to advance the member from a point remote from said open end to a point directly in front of the open end where it abuts the end of a billet positioned within said coil, an aperture in said member, a temperature measuring device arranged to pass through said aperture and into contact with the end of a billet abutting the member, a motor device for forcing said temperature measuring device through said aperture and into contact with said end of the billet, a power circuit for supplying electrical energy to said induction coil, and a control circuit responsive to a predetermined condition of said power circuit for actuating said motor device to force said temperature measuring device through said aperture.

5. The combination claimed in claim 4 in which the temperature measuring device comprises a pair of spaced metal probes of dissimilar metal secured within a block of insulating material.

6. In an electric induction furnace of the type having an open-ended induction coil within which a billet is heated, the combination of a member arranged to retain a billet within said coil during a heating operation, an aperture in the billet-retaining member, a thermocouple carried by said member and arranged to pass through said aperture and into contact with the end of a billet, said thermocouple comprising a pair of prongs of dissimilar metal secured within a block of insulating material, and means for advancing the thermocouple through said aperture after a billet heating operation has begun whereby the ends of said probes will come into contact with the billet.

7. In an electric induction furnace of the type having an open-ended induction coil within which a billet is heated, the combination of a member arranged to retain a billet within said coil during a heating operation, a surface on said member arranged to abut the end of a billet during the aforesaid heating operation, a thermocouple carried by said member behind the billet-abutting surface, an electrical device for moving the thermocouple into contact with said end of the billet, circuit means for controlling the application of electrical energy to said induction coil, and time delay means connecting said control circuit means with said electrical device whereby the electrical device will force said thermocouple into contact with the end of a billet after a predetermined amount of time has elapsed subsequent to the application of electrical energy to said induction coil.

8. In an electric induction furnace of the type having an open-ended induction coil within which a billet is heated, the combination of a member arranged to retain a billet within said coil during a heating operation, a surface on said member arranged to abut the end of a billet during the aforesaid heating operation, a temperature measuring device carried by said member behind the billet-abutting surface, apparatus for selectively moving said temperature measuring device into contact with the end of a billet which abuts said surface, power circuit means for supplying electrical energy to said induction coil, and further circuit means responsive to a predetermined condition of said power circuit means for actuating said apparatus to move the temperature measuring device into contact with said end of the billet.

References Cited in the file of this patent

UNITED STATES PATENTS 2,676,234     Lackner et al.  ----------- Apr. 20, 1954